(12) United States Patent
Choi et al.

(10) Patent No.: US 7,387,725 B2
(45) Date of Patent: Jun. 17, 2008

(54) ONE-TOUCH FITTING TYPE SINGLE OR MULTIPLE ADAPTER, FILTER ASSEMBLY DETACHABLY ENGAGED WITH THE SAME AND WATER PURIFYING SYSTEM EMPLOYING THESE ELEMENTS

(75) Inventors: Suk-Rim Choi, Incheon-si (KR); Seok-Bong Bang, Incheon-si (KR)

(73) Assignee: Picogram Co., Ltd., Buncheon-si (KR)

( * ) Notice: Subject to any disclaimer, the term of this patent is extended or adjusted under 35 U.S.C. 154(b) by 395 days.

(21) Appl. No.: 11/171,347

(22) Filed: Jul. 1, 2005

(65) Prior Publication Data
US 2006/0000761 A1   Jan. 5, 2006

(30) Foreign Application Priority Data
Jul. 5, 2004   (KR) .................. 10-2004-0051866
Jul. 5, 2004   (KR) .................. 20-2004-0018967 U

(51) Int. Cl.
*B01D 35/153*   (2006.01)
*B01D 35/30*    (2006.01)
*B01D 27/08*    (2006.01)

(52) U.S. Cl. .............. 210/232; 210/234; 210/235; 210/444; 251/149.6; 137/614.03; 137/614.05; 285/305; 285/308; 285/316; 285/317

(58) Field of Classification Search .......... 210/232, 210/234, 235, 444; 251/149.6; 137/614.03, 137/614.05; 285/305, 308, 316, 317
See application file for complete search history.

(56) References Cited

U.S. PATENT DOCUMENTS

| | | | | |
|---|---|---|---|---|
| 3,319,791 A | * | 5/1967 | Horne | 210/234 |
| 3,399,776 A | * | 9/1968 | Knuth | 210/234 |
| 4,371,439 A | * | 2/1983 | Thornton | 210/232 |
| 4,985,142 A | * | 1/1991 | Laycock et al. | 210/130 |
| 5,336,406 A | * | 8/1994 | Stanford et al. | 210/235 |
| 5,753,107 A | * | 5/1998 | Magnusson et al. | 210/109 |
| 5,914,037 A | * | 6/1999 | Yen | 210/234 |
| 6,457,322 B1 | * | 10/2002 | Kim et al. | 62/318 |

\* cited by examiner

*Primary Examiner*—Thomas M. Lithgow
(74) *Attorney, Agent, or Firm*—Sughrue Mion, PLLC

(57) ABSTRACT

A one-touch fitting type adapter and a filter assembly are provided in which the filter assembly used for machinery, such as a bidet or a refrigerator, is easily assembled with or disassembled from the adapter through a one-touch fitting manner such that the filter assembly is easily adapted for the machinery. A multiple adapter capable of coupling a plurality of adapters in series is provided such that a plurality of filter assemblies used for a water purifier, a water ionizer or a functional water maker are detachably engaged with the multiple adapter through a one-touch fitting manner.

11 Claims, 13 Drawing Sheets

Section A"A"

inlet outlet

ONE-TOUCH FITTING TYPE SINGLE OR MULTIPLE ADAPTER, FILTER ASSEMBLY DETACHABLY ENGAGED WITH THE SAME AND WATER PURIFYING SYSTEM EMPLOYING THESE ELEMENTS

BACKGROUND OF THE INVENTION

1. Field of the Invention

The present invention relates generally to a filter assembly and a one-touch fitting type adapter detachably engaging the filter assembly, and more particularly to a filter assembly used for a bidet, a water purifier, a water ionizer, a refrigerator or a functional water maker, and a single or a multiple adapter engaging and disengaging the filter assembly in one-touch fitting manner.

2. Description of the Related Art

In general, machinery, such as a bidet, a water purifier, and a water ionizer, may include a filter for filtering or purified water and an adapter for allowing the filter to be adapted for such machinery.

Conventionally, the adapter and the filter assembly are assembled with each other by using a separate coupling unit or by fabricating the adapter and filter in the form of complex male and female clamps, respectively. In addition, the filter assembly is generally disassembled from the adapter through a complex disassembling procedure or by using a separate disassembling unit. Furthermore, a separate source-water inflow cutoff unit is necessary in order to prevent source water from being fed from the machinery when exchanging the filter assembly with a new one.

However, such a conventional structure for the filter assembly and the adapter causes a complex coupling or decoupling procedure when the filter assembly is coupled with or decoupled from the adapter, thereby resulting in a difficulty in filter exchange work. In addition, if the machinery is equipped with a plurality of filter assemblies, such complex filter exchange work must be carried out with respect to the plural filter assemblies, so users must require their products to be serviced at the service center of the manufacturing company or must call a service agent to exchange their filter assemblies with new ones.

SUMMARY OF THE INVENTION

The present invention is directed to a one-touch fitting type adapter and a filter assembly that substantially obviate one or more problems due to limitations and disadvantages of the related art.

It is an object of the present invention to provide a one-touch fitting type adapter and a filter assembly used for machinery, such as a bidet, a water purifier, a water ionizer, a refrigerator, or a functional water maker, in which the filter assembly is easily assembled with or disassembled from the adapter through a one-touch fitting manner such that the filter assembly is easily adapted for the machinery.

Another object of the present invention is to provide a one-touch fitting type adapter and a filter assembly detachably engaged with the adapter, in which source water is automatically prevented from being fed by means of a check valve without using a separate source-water inflow cutoff unit when the filter assembly is disassembled from the adapter for exchanging a filter assembly with a new one.

Still another object of the present invention is to provide a one-touch fitting type multiple adapter assembly including a plurality of adapters connected with each other in series and for detachably engaging a plurality of filter assembles through ore-touch fitting manner, and a water purifying system equipped with the multiple adapter assembly and the plural filter assemblies detachably engaged with the same.

To achieve these objects and other advantages in accordance with the purpose of the invention, as embodied and broadly described herein, there is provided a one-touch fitting type adapter for detachably engaging a filter assembly provided at one end thereof with a cylindrical fluid passage having a collar flange, the one-touch fitting type adapter comprising: an adapter body formed at both upper sides thereof with an inlet port and an outlet port and formed at a center thereof with a central channel communicated with the inlet and outlet ports; a check valve installed in the central channel so as to adjust inflow or cutoff of source water flowing through the inlet port; an upper cover for covering an upper portion of the central channel; a lower cover installed at a lower portion of the adapter body and formed with a central hole communicated with the central channel of the adapter body, the cylindrical fluid passage of the filter assembly being inserted into the central hole of the lower cover; a pair of slide plates installed on the lower cover, the slide plates having opposite inclined elongate holes and opposite arcuate sections for detachably coupling the collar flange formed at the cylindrical fluid passage of the filter assembly, the slide plates being elastically biased towards each other by means of a spring; and a release button unit including two parallel bars formed with protrusions inserted into the inclined elongate holes, respectively, and one horizontal push bar connecting ends of the parallel bars to each other, wherein, when the filter assembly is disassembled from the adapter, the horizontal push bar is pushed, so the parallel bars move in a forward direction while pushing sidewalls of the inclined elongated holes so that the slide plates horizontally move perpendicularly to a moving direction of the protrusions away from each other, thereby allowing the filter assembly to be disassembled from the adapter.

According to another aspect of the present invention, there is provided a filter assembly detachably engaged with the above one-touch fitting type adapter, the filter assembly comprising: an outer housing formed at an inlet portion thereof with a cylindrical fluid passage having a collar flange; a filter member installed in the outer housing spaced apart from an inner wall of the outer housing; and a water guide installed between an upper end of the filter member and the cylindrical fluid passage of the outer housing in order to guide source water to the filter member when source water is introduced thereto through the check valve of the one-touch fitting type adapter and to guide water purified by the filter member into the outlet port of the one-touch fitting type adapter, wherein the water guide includes an annular partition wall forming an inflow passage of source water through the check valve and for preventing source water from being mixed with the purified water, a source water path transfer passage for guiding the source water from the inflow passage of the partition wall to a flowing space formed between the sidewall of the filter member and the inner wall of the outer housing, a purified water outlet passage for discharging water introduced from the flowing space into and purified by the filter member to an exterior through the outside of the inflow passage of the partition wall, and a push rod installed at an inner central portion of the annular partition wall so as to open the check valve of the adapter while making press-contact with the check valve.

According to still another aspect of the present invention, there is provided a one-touch fitting type adapter for detachably engaging a filter assembly provided at one end thereof with a cylindrical fluid passage having opposite partially arcuate collar flanges, the one-touch fitting type adapter comprising: an adapter body formed at both upper sides thereof with an inlet port and an outlet port and formed at a center thereof with a central channel communicated with the inlet and outlet ports; a check valve installed in the central channel so as to adjust inflow or cutoff of source water flowing through the inlet port; an upper cover for covering an upper portion of the central channel hole; and a lower cover installed at a lower portion of the adapter body and formed with a central hole communicated with the central channel of the adapter body, the cylindrical fluid passage of the filter assembly being inserted into the central hole of the lower cover, wherein the central hole of the lower cover is formed at an outer peripheral portion thereof with opposite partial circumferential rims in such a manner that the cylindrical fluid passage having the partially arcuate collar flanges is fittingly inserted into the hole of the lower cover, and when the filter assembly is engaged with the adapter, the filter assembly is rotated in one-touch manner relative to the adapter so that the opposite partially arcuate collar flanges of the cylindrical fluid passage are partially screwed and engaged with the opposite partially circumferential rims formed at the central hole of the lower cover of the adapter, thereby detachably coupling the filter assembly to the adapter.

According to yet still another aspect of the present invention, there is provided a filter assembly detachably engaged with the above one-touch fitting type adapter, the filter assembly comprising: an outer housing formed at an inlet portion thereof with a cylindrical fluid passage having a partially arcuate collar flange; a filter member installed in the outer housing spaced apart from an inner wall of the outer housing; and a water guide installed between an upper end of the filter member and the cylindrical fluid passage of the outer housing in order to guide source water to the filter member when source water is introduced thereto through the check valve of the one-touch fitting type adapter and to guide water purified by the filter member into the outlet port of the one-touch fitting type adapter, wherein the water guide includes an annular partition wall forming an inflow passage of source water through the check valve and for preventing source water from being mixed with the purified water, a source water path transfer passage for guiding the source water from the inflow passage of the partition wall to a flowing space formed between the sidewall of the filter member and the inner wall of the outer housing, a purified water outlet passage for discharging water introduced from the flowing space into and purified by the filter member to an exterior through the outside of the inflow passage of the partition wall, and a push rod installed at an inner central portion of the annular partition wall so as to open the check valve of the adapter while making press-contact with the check valve.

According to yet still another aspect of the present invention, there is provided a multiple adapter engaged with a plurality of filter assemblies, the multiple adapter comprising: a plurality of one-touch fitting type adapters aligned in parallel to each other; backflow preventing valves installed at outlet ports of the one-touch fitting type adapters; and plug type connection members installed between inlet ports and outlet ports of adjacent adapters such that the adjacent adapters rotate relative to each other, wherein O-rings are provided between outer peripheral surfaces of the plug type connection members and inner peripheral surfaces of the inlet ports and outlet ports.

The partially arcuate collar flange is provided at one end thereof with an inclined portion.

According to the preferred embodiment of the present invention, the check valve includes a valve body having an inclined seat surface and being communicated with the inlet port, a fluid passage extending from the valve body to a lower portion of the central channel of the adapter body, a valve plunger having a plunger head closely adjacent to the inclined seat surface and being installed in the fluid passage such that the valve plunger opens/closes the fluid passage when the filter assembly is assembled with or disassembled from the adapter while moving in the fluid passage by means of pressing force applied thereto from the filter assembly, and a valve spring supported by the upper cover while elastically biasing the plunger head installed on the inclined seat surface of the valve body.

According to the preferred embodiment of the present invention, the end parts of the arcuate sections of the slide plates, which make contact with the collar flange formed at the fluid passage of the filter assembly when the filter assembly is assembled into the one-touch fitting type adapter, are formed with inclined portions so as to allow the filter assembly to be easily inserted into the arcuate sections through riding therealong.

According to the preferred embodiment of the present invention, a backflow preventing valve is installed in the outlet port of the adapter body so as to prevent residual purified water remaining at a rear portion of the outlet port from flowing back or dropping down from the outlet port when the filter assembly is disassembled from the adapter.

According to the preferred embodiment of the present invention, the horizontal push bar of the release button unit is formed with a mounting hole for a safety pin for preventing the push bar from being pushed so as to prevent the filter assembly from being unintentionally separated from the adapter.

According to the preferred embodiment of the present invention, the filter member includes at least one selected from the group consisting of a hollow fiber filter, a non-woven fabric filter, an activated carbon filter, a reverse osmosis membrane filter, and a functional ceramic filter.

Additional advantages, objects, and features of the invention will be set forth in part in the description which follows and in part will become apparent to those having ordinary skill in the art upon examination of the following or may be learned by practicing the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Wherever possible, the same reference numbers will be used throughout the drawings to refer to the same or like parts.

Hereinafter, a preferred embodiment of the present invention will be explained with reference to the accompanying drawings.

Figure 1A:
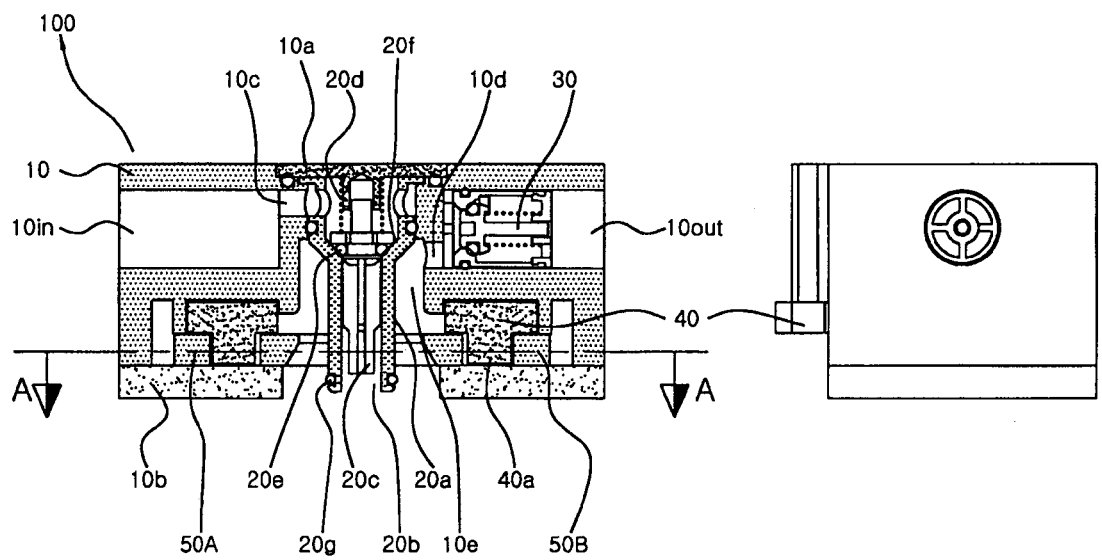
FIG. 1A shows a longitudinally sectional view and a side view of an adapter for engaging a filter assembly according to one embodiment of the present invention.
Figure 1B:
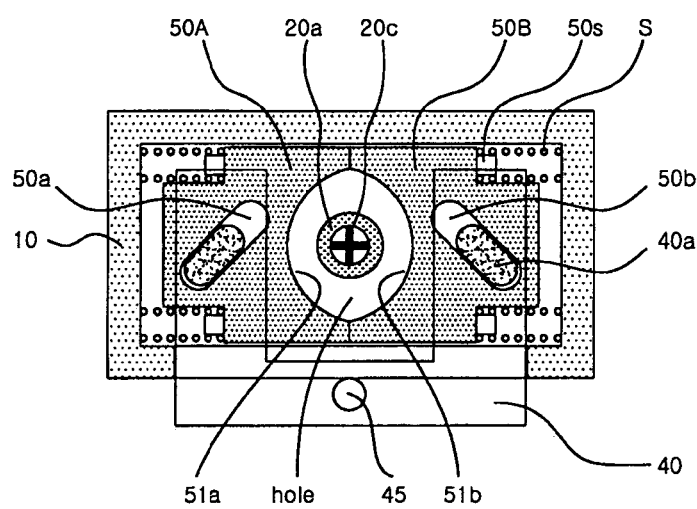
FIG. 1B is a cross-sectional view taken along line A-A shown in FIG. 1A.
Figure 1C:
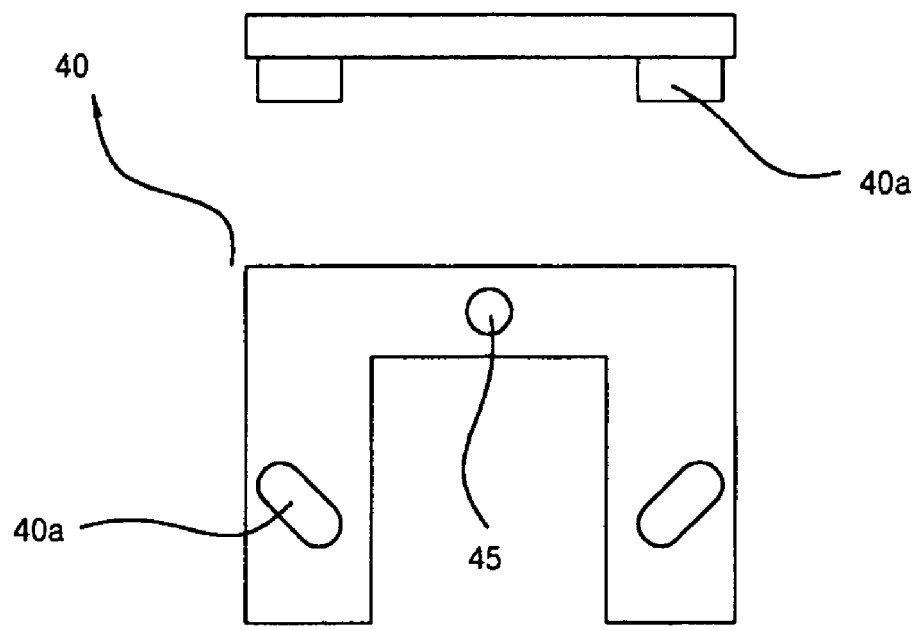
FIG. 1C shows a front view and a plan view for a release button of an adapter shown in FIG. 1A.
Figure 1D:
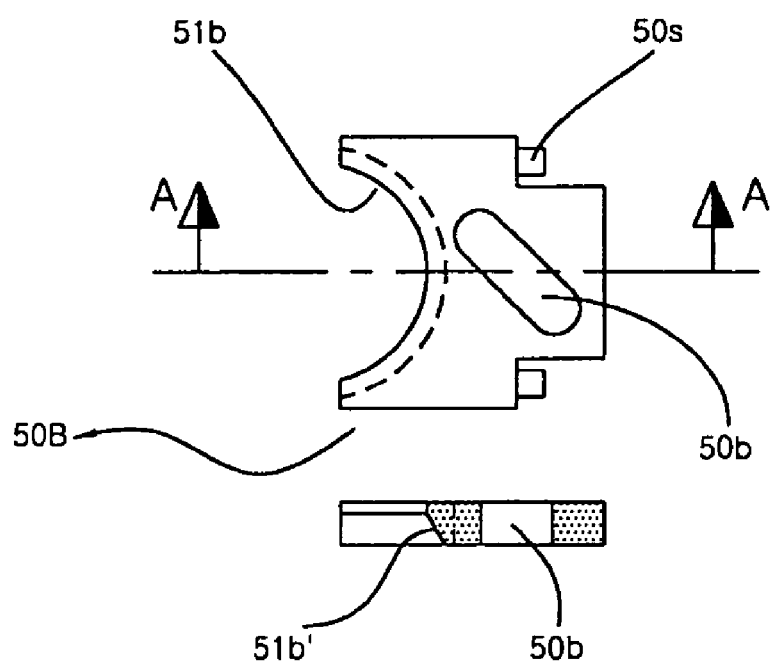
FIG. 1D shows a plan view of a slide plate of an adapter shown in FIG. 1A and a sectional view taken along line A-A shown in the plan view.

FIG. 1A shows a longitudinally sectional view and a side view of an adapter for engaging a filter assembly according to one embodiment of the present invention, FIG. 1B is a cross-sectional view taken along line A-A shown in FIG. 1A, FIG. 1C shows a front view and a plan view for a release button of the adapter shown in FIG. 1A, and FIG. 1D shows a plan view of a slide plate of the adapter shown in FIG. 1A and a sectional view taken along line A-A shown in the plan view.

Referring to FIGS. 1A to 1D, an adapter 100 according to one embodiment of the present invention is a one-touch fitting type adapter for allowing a filter assembly formed at one end thereof with a cylindrical passage having a collar flange to be detachably engaged with the adapter 100.

The one-touch fitting type adapter 100 of the present invention includes an adapter body 10 formed at both upper sides thereof with an inlet port 10in, a source water inlet hole 10c, a purified water outlet hole 10d, and a purified water outlet port 10out and formed at a center thereof with a central channel communicated with the above inlet and outlet ports and holes, a check valve 20 installed in the central channel so as to adjust inflow or cutoff of source water flowing through the inlet port 10in, an upper cover 10a for covering an upper portion of the central channel, a lower cover 10b installed at a lower portion of the adapter body 10 such that the lower cover 10b is communicated with the central channel, slide plates 50A and 50B installed on the lower cover 10b and moved in opposition to each other so as to detachably assemble the filter assembly to the adapter 100, and a release button unit 40 for releasing the assembled state between the slide plates 50A and 50B and the filter assembly and therefore disassembling them.

The check valve 20 includes a valve body having an inclined seat surface 20f and being communicated with the inlet port 10in, a fluid passage 20a extending from the valve body to a lower portion of the central channel, a valve plunger 20c having a plunger head closely adjacent to the inclined seat surface 20f and being installed in the fluid passage 20a such that the valve plunger 20c can open/close the fluid passage 20a when the filter assembly is assembled with or disassembled from the adapter while moving in the fluid passage 20a by means of pressing force applied thereto from the filter assembly, and a valve spring 20d supported by the upper cover 10a while elastically biasing the plunger head installed on the inclined seat surface 20f of the valve body.

The plunger head of the valve plunger 20c is provided with an O-ring 20e so as to seal a gap formed between the plunger head and the inclined seat surface 20f.

A source water passage 20b is formed in the fluid passage 20a so that source water is supplied from the inlet port 20in through the source water passage 20b. The valve plunger 20c includes the plunger head provided with the O-ring 20e and is subject to elastic biasing force of the valve spring 20d supported by the upper cover 10a, so the plunger head of the valve plunger 20c closely makes contact with the inclined seat surface of the valve body unless external force is applied to the plunger head of the valve plunger 20c.

According to one embodiment of the present invention, a backflow preventing valve 30 (i.e., check valve) is installed in the purified water outlet port 10out of the adapter body 1 so as to prevent residual purified water remaining at a rear portion of the purified water outlet port 10out from flowing back or dropping down from the purified water outlet port 10out.

The slide plates 50A and 50B have inclined elongate holes 50a and 50b, which are opposite to each other, and opposite arcuate sections 51a and 51b for detachably coupling a collar flange (215, see FIG. 2) provided at an inlet portion of the filter assembly to the adapter 100 through the association with each other. The slide plates 50A and 50B are biased in opposition to each other by means of a spring mounted on a spring mounting protrusion 50s. The end parts of the arcuate sections 51a and 51b of the slide plates 50A and 50B are formed with inclined portions (see, 51b' in FIG. 1D) so as to allow the filter assembly to be easily engaged with the arcuate sections 51a and 51b while moving along the inclined portions.

Accordingly, when the filter assembly 200 is assembled with the adapter 100, the collar flange 215 provided at the inlet portion of the filter assembly moves upward along the inclined portion 51b' of the arcuate sections 51a and 51b of the slide plates 50A and 50B while horizontally moving the slide plates 50A and 50B in left and right directions. When the collar flange 215 moves upward beyond the inclined portion 51b' of the arcuate sections 51a and 51b of the slide plates 50A and 50B, the slide plates 50A and 50B may return to their initial position by means of bias force of springs S so that the filter assembly is engaged with the slide plates 50A and 50B.

The release button unit 40 includes two parallel bars formed with protrusions 40a inserted into the inclined elongate holes 50a and 50b and one horizontal push bar connecting ends of the parallel bars to each other. When it is necessary to disassemble the filter assembly 200 from the adapter 100, a user pushes the release button unit 40 such that the release button unit 40 moves in a forward direction. At this time, the protrusions 40a inserted into the inclined elongate holes 50a and 50b of the slide plates 50A and 50B also move in the forward direction along the inclined elongate holes 50a and 50b while making contact with sidewalls of the inclined elongate holes 50a and 50b, so the slide plates 50A and 50B horizontally move in left and right directions perpendicularly to the moving direction of the protrusions 40a of the release button unit 40. As a result, the slide plates 50A and 50B are moved away from each other so that the filter assembly 200 can be disassembled from the adapter 100.

The horizontal push bar of the release button unit 40 is formed with a mounting hole 45 for a safety pin for preventing the push bar from being pushed so as to prevent the filter assembly 200 from being unintentionally separated from the adapter 100.

According to another aspect of the present invention, the filter assembly 200 is detachably engaged with the one-touch fitting type adapter 100 shown in FIG. 1A.

Figure 2:
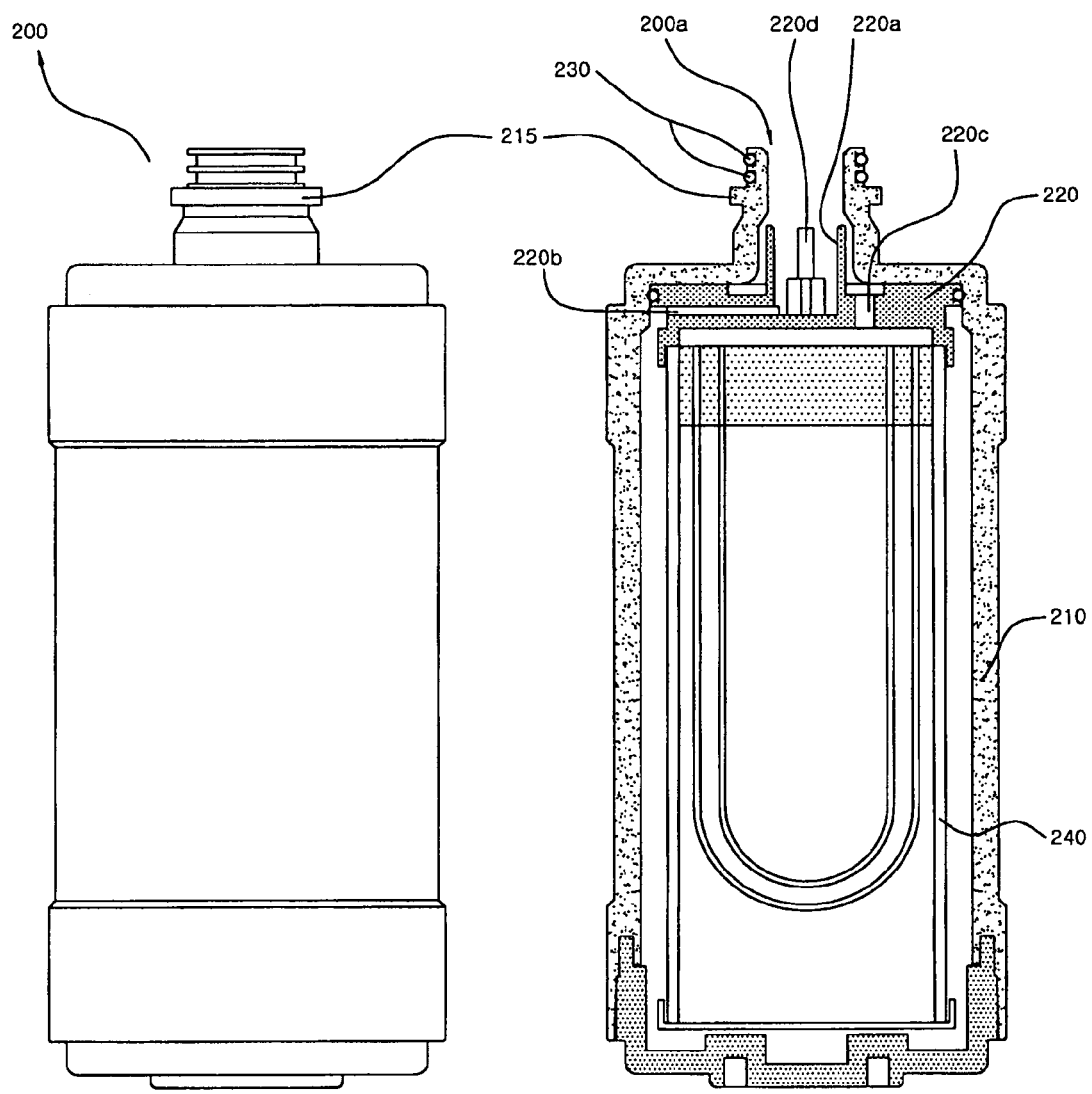
FIG. 2 is a view showing a filter assembly engaged with an adapter shown in FIG. 1A according to one embodiment of the present invention.

FIG. 2 shows the filter assembly 200 according to one embodiment of the present invention.

As shown in FIG. 2, the filter assembly 200 includes an outer housing 210 formed at an inlet portion thereof with a cylindrical fluid passage 200a having a collar flange, a filter member 240 installed in the outer housing spaced apart from an inner wall of the outer housing, and a water guide 220 installed between an upper end of the filter member 240 and the cylindrical fluid passage 200a of the outer housing 210 in order to guide source water to the filter member 240 when water is introduced thereto through the check valve of the one-touch fitting type adapter 100 and to guide water purified by the filter member 240 into the purified water outlet port 10out of the one-touch fitting type adapter 100. The water guide 220 includes an annular partition wall 220a forming an inflow passage of source water through the check valve and for preventing source water from being mixed with purified water, a source water path transfer passage 220b for guiding source water from the inflow passage to a flowing space formed between the sidewall of the filter member and the inner wall of the outer housing, a purified water outlet passage 220c installed at the upper side of the filter member for discharging water introduced from the inflowing space into and purified by the filter member to an exterior through the outside of the inflow passage of the partition wall, and a push rod 220d installed at an inner central portion of the annular partition wall 220a so as to open the check valve while making contact with the valve plunger 20c of the check valve. As a result, source water is introduced from the check valve to the flowing space through the inflow passage of the partition wall, filtered by the filter member while flowing from the lower portion to the upper portion of the filter member, and discharged to the exterior through the purified water outlet passage 220c (i.e., water flowing in arrow directions as shown in FIG. 3C).

The filter member 240 includes at least one selected from the group consisting of a hollow fiber filter, a non-woven fabric filter, an activated carbon filter, a reverse osmosis membrane filter, and a functional ceramic filter. One of the above filter members or at least two of the above filter members may form the filter assembly.

FIGS. 3a to 3d show the method for assembling or disassembling the filter assembly 200 into or from the one-touch fitting type adapter 100.

Figure 3A:
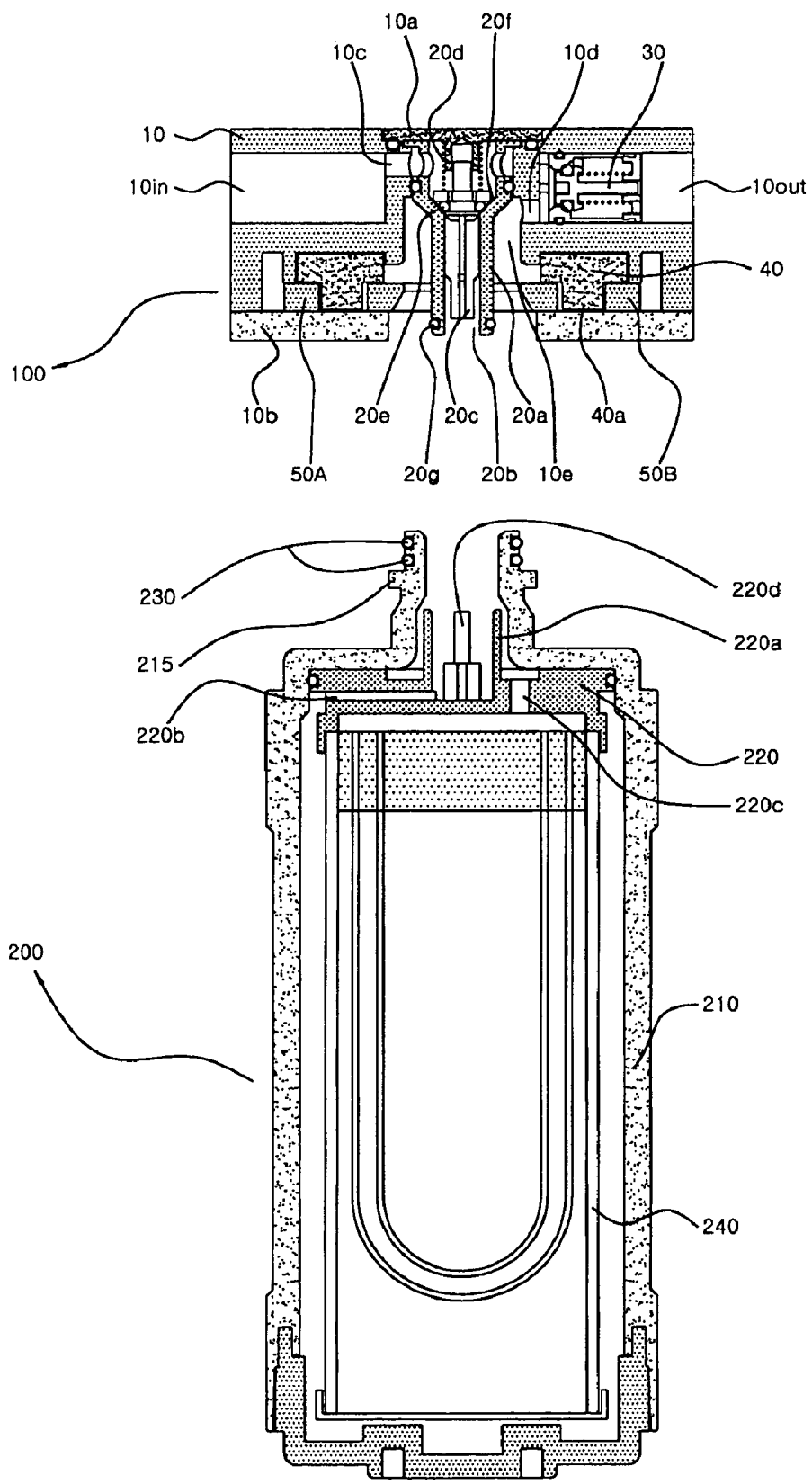
FIG. 3A illustrates an adapter shown in FIG. 1A and a filter assembly shown in FIG. 2, which are separated from each other according to one embodiment of the present invention.

FIG. 3A illustrates the adapter shown in FIG. 1A and the filter assembly shown in FIG. 2, which are separated from each other according to one embodiment of the present invention.

In the state where the adapter and the filter assembly are separated from each other as shown in FIG. 3A, slide plates 50A and 50B of the adapter 100 are biased such that they make contact with each other by means of the spring. In addition, protrusions 40a of the release button unit 40 inserted into the inclined elongate holes 50a and 50b are positioned at a start point of the inclined elongate holes 50a and 50b, that is, a lower portion in the plan view shown in FIG. 3A.

In addition, since the check valve 20 installed in the central channel of the adapter is downwardly biased by means of the valve spring 20d, the O-ring 20e closely makes contact with the inclined seat surface 20f formed in the valve body 20a so that the passage of source water is closed by means of the O-ring 20e, thereby cutting off the inflow of the source water.

Figure 3B:
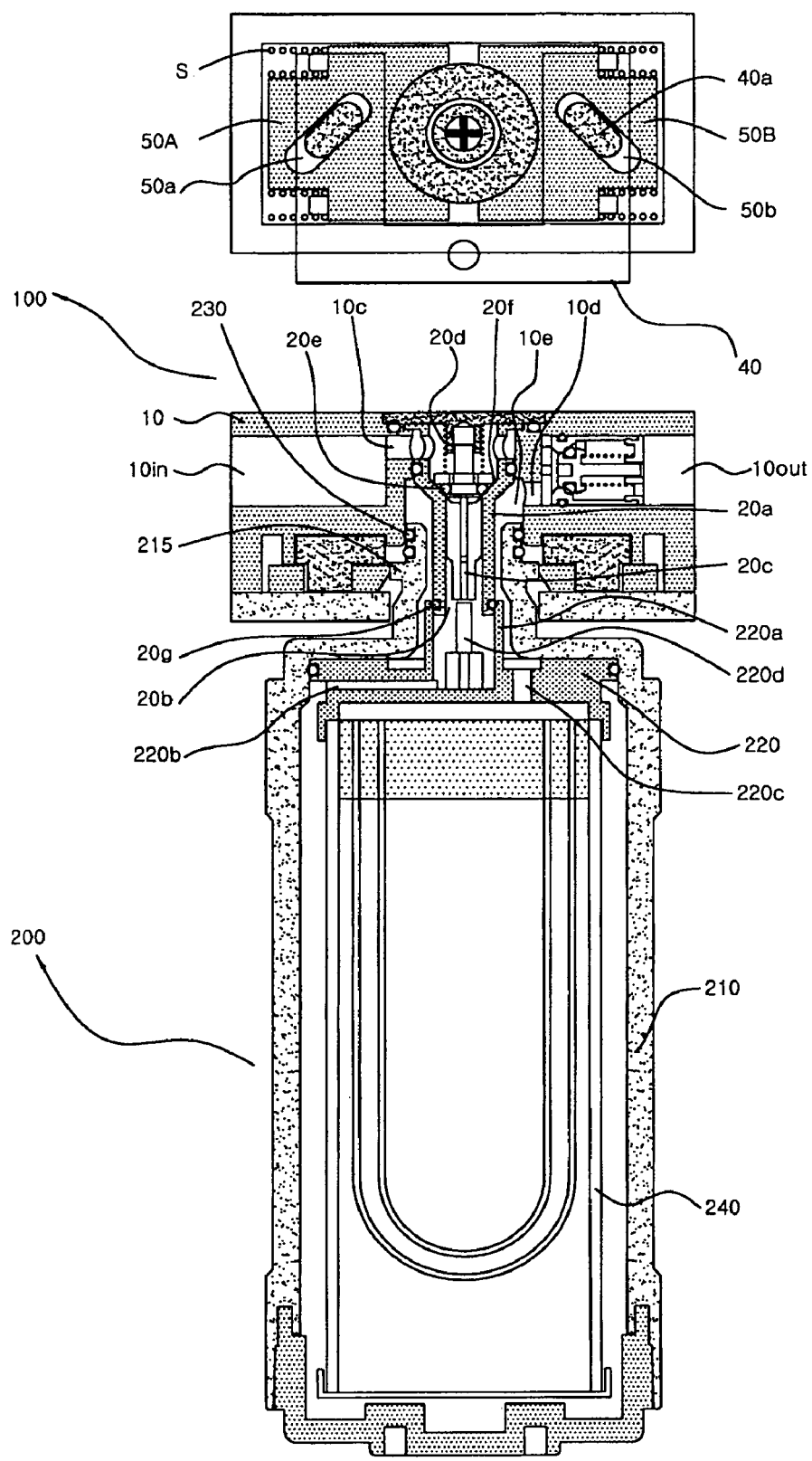
FIG. 3B illustrates an adapter shown in FIG. 1A and a filter assembly shown in FIG. 2 just before the filter assembly is assembled into the adapter according to one embodiment of the present invention.
Figure 3C:
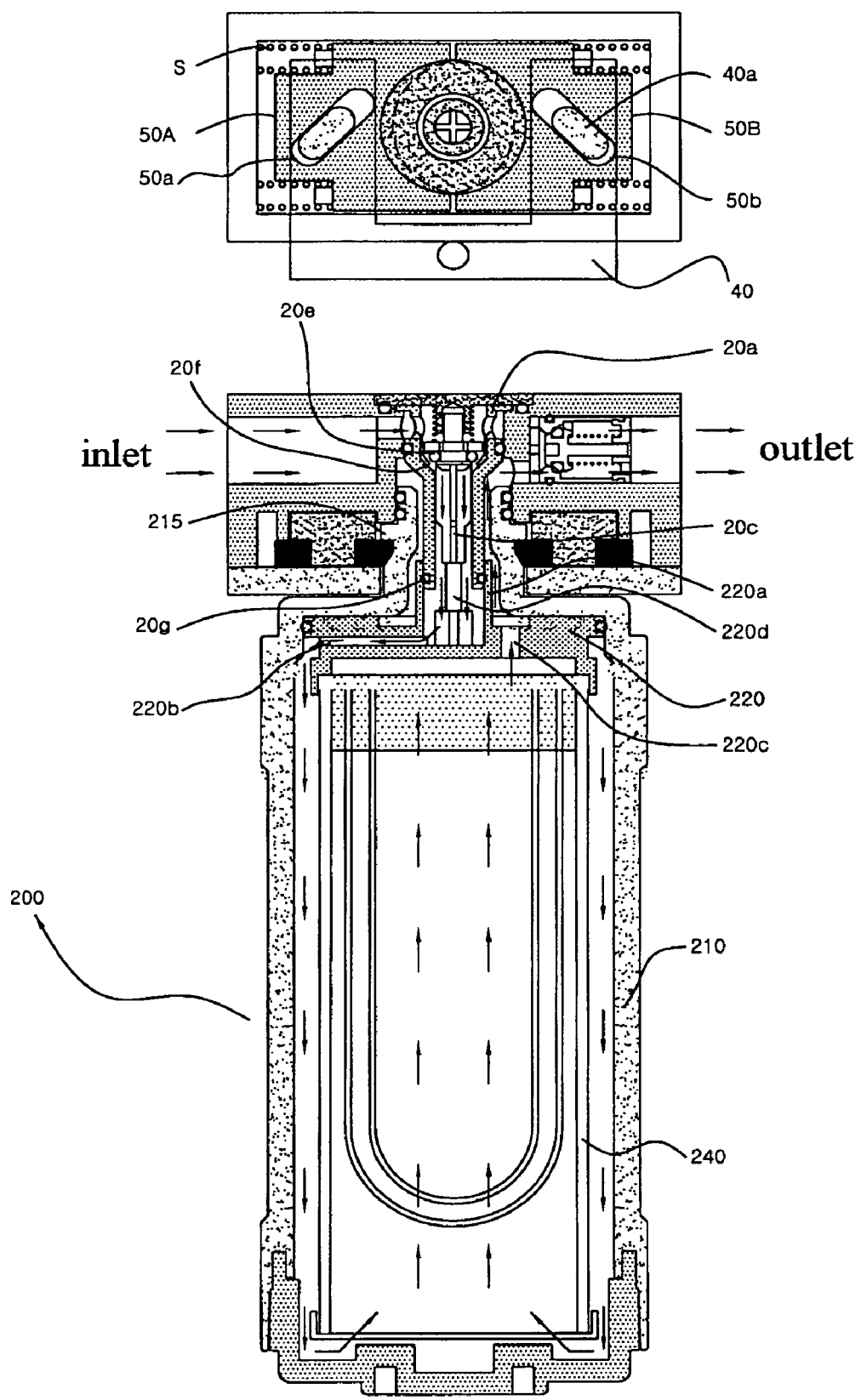
FIG. 3C illustrates an adapter shown in FIG. 1A and a filter assembly shown in FIG. 2 when they are assembled with each other according to one embodiment of the present invention.

FIG. 3B illustrates the adapter shown in FIG. 1A and the filter assembly shown in FIG. 2 just before the filter assembly is assembled into the adapter according to one embodiment of the present invention, and FIG. 3C illustrates the adapter shown in FIG. 1A and the filter assembly shown in FIG. 2 when they are assembled with each other according to one embodiment of the present invention.

The filter assembly 200 is assembled into the adapter 100 through the following procedure.

First, if a user pushes up the filter assembly 200 into the central channel hole formed at a lower portion of the adapter 100, the collar flange 213 provided at the upper inlet portion of the outer housing 210 of the filter assembly 200 upwardly moves while making contact with inclined portions 51a' and 51b' of the arcuate sections 51a and 51b of the slide plates 50A and 50B.

Accordingly, the slide plates 50A and 50B move away from each other. At the same time, the protrusions 40a inserted into the inclined elongate holes 50a and 50b move along the inclined elongate holes 50a and 50b. At this time, the protrusions 40a inserted into the inclined elongate holes 50a and 50b are positioned at middle portions of the inclined elongate holes 50a and 50b as shown in FIG. 3B.

At this time, the adapter 100 and the filter assembly 200 are maintained in a sealing state. In detail, FIG. 3B illustrates the filter assembly 200 just before the filter assembly 200 is assembled with the adapter 100, that is, just before the push rod 220d installed at an inner central portion of the annular partition wall 220a formed at a leading end of the water guide 220 pushes the lower end of the valve plunger 20c installed in the fluid passage 20a of the check valve. Therefore, the O-ring 20e of the valve plunger 20c still makes contact with the inclined seat surface 20f of the valve body so that the source water passage 20b is maintained in a closed state by means of the O-ring 20e of the valve plunger 20c. At the same time, an O-ring 20g, which is installed at a lower end of the fluid passage 20a so as to prevent the source water from being leaked, makes contact with the inner surface of the annular partition wall 220*a*, which is installed in the filter assembly 200 so as to prevent the source water from being mixed with the purified water, thereby sealing between the fluid passage 20*a* and the annular partition wall 220*a*. In addition, at least one O-ring 230 is installed around the cylindrical fluid passage provided at the leading end of the filter assembly in order to prevent the purified water from being leaked. The O-ring 230 makes contact with the inner surface of the central channel of the adapter 100 so as to seal between the filter assembly and the adapter. Accordingly, the source water passage is provided separately from the purified water passage. In addition, the purified water is maintained in the fluid passages formed in the filter assembly and the adapter without being leaked towards the exterior.

If the collar flange 215 once moves up beyond the inclined portions 51*a*' and 51*b*' of the slide plates 50A and 50B, the slide plates 50A and 50B are biased in opposition to each other by means of the spring S so that the slide plates 50A and 50B moves while facing each other, so the collar flange is restricted by means of the slide plates 50A and 50B. Accordingly, the filter assembly 200 is assembled with the adapter 100.

At this time, the release button unit 40 is ejected forward of the adapter 100 because the protrusions 40*a* inserted in the inclined elongate holes 50*a* and 50*b* of the slide plates 50A and 50B are slidably moved in the forward direction. At this time, the protrusions 40*a* inserted in the inclined elongate holes 50*a* and 50*b* of the slide plates 50A and 50B are slightly spaced from the lower point of the inclined elongate holes 50*a* and 50*b* as shown in FIG. 3C.

While the filter assembly 200 is being assembled with the adapter 100, the push rod 220*d* of the filter assembly 200 may push the valve plunger 20*c* of the check valve 20 installed in the adapter 100 in the upward direction, so the O-ring 20*e* making contact with the inclined seat surface 20*f* is spaced from the inclined seat surface 20*f* so that the source water passage 20*b* is opened. Since the check valve 20 is communicated with the inlet port 10in of the adapter body 10, if the check valve 20 is opened, the source water flowing through the inlet port 10in of the adapter body 10 may flow into the annular partition wall 220*a* of the water guide 220 through the source water passage 20*b* of the fluid passage 20*a* formed at the center of the check valve.

As shown in FIG. 3C, the source water introduced into the filter assembly is prevented from being mixed with the purified water by means of the annular partition wall 220*a* installed at the leading end of the water guide 220 aligned between the filter member and the inlet port, and the O-ring 20*g*. In addition, the source water flows through the flowing space between the inner wall of the outer housing 210 and the sidewall of the filter member 240 while passing through the source water path transfer passage 220*b*. Then, the source water is filtered while passing through the filter member 240 and flows in the upward direction. Thus, the source water filtered by the filter member 240 may flow into a space defined by the outer surface of the annular partition wall 220*a*, the outer surface of the fluid passage 20*a* of the check valve and the inner surface of a neck section formed at the leading end of the filter assembly. Then, the purified water is discharged to the exterior through the purified water space 10*e*, the purified water outlet hole 10*d* and the purified water outlet port 10out. As a result, water flows along paths according to arrow directions as shown in the drawing.

When the filter assembly has been assembled with the adapter, a safety pin is inserted into the safety pin mounting hole 45 of the release button unit 40 such that the release button unit 40 cannot be moved, thereby preventing the filter assembly from being unintentionally separated from the adapter.

Figure 3D:
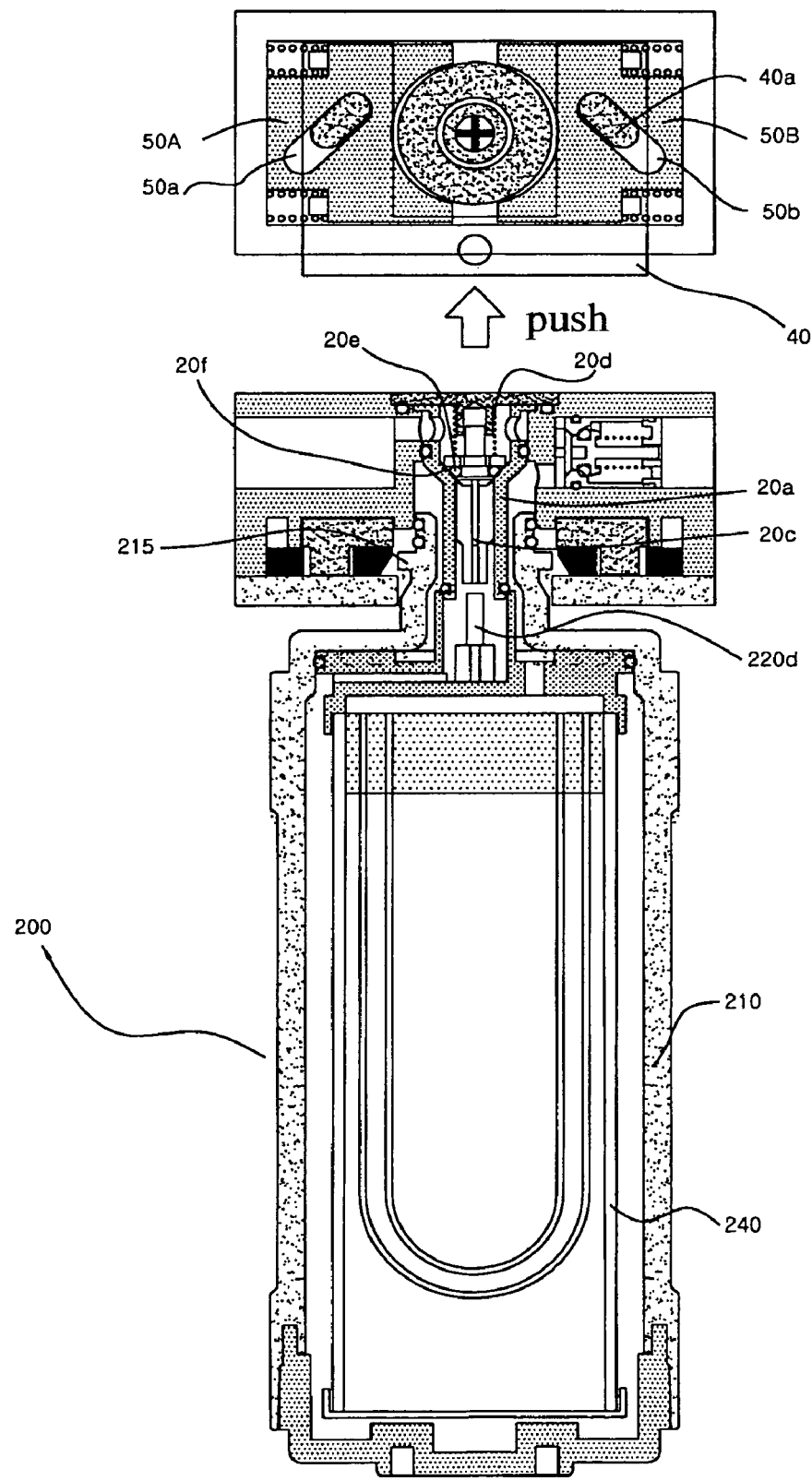
FIG. 3D is a view showing a method of disassembling the filter assembly shown in FIG. 2 from the adapter shown in FIG. 1A in the assembling state shown in FIG. 3C according to one embodiment of the present invention.

FIG. 3D is a view showing a method of disassembling the filter assembly shown in FIG. 2 from the adapter shown in FIG. 1A in the assembling state shown in FIG. 3C according to one embodiment of the present invention.

If it is necessary to exchange the filter assembly 200 from the adapter, a user removes the safety pin from the release button unit 40 and pushes the release button unit 40.

If the user pushes the release button unit 40, the release button unit 40 moves in the forward direction together with the protrusions 40*a* fixed to the release button unit 40. Since the protrusions 40*a* are inserted into the inclined elongate holes 50*a* and 50*b* of the slide plates 50A and 50B, the forward movement of the protrusions may cause the slide plates 50A and 50B to move away from each other. Therefore, the slide plates 50A and 50B, which grip the collar flange 215 of the filter assembly may move in the left and right directions in opposition to each other so that the filter assembly can be separated from the adapter. At this time, pressing force of the push rod 220*d* applied to valve plunger 20*c* is released so that the valve plunger 20*c* is moved in the downward direction caused by biasing force of the valve spring 20*d*. Thus, the O-ring 20*e* of the valve plunger closely makes contact with the inclined valve seat surface 20*f* of the valve body, thereby cutting off the inflow of the source water.

In addition, according to another embodiment of the present invention, there is suggested modified structures for the adapter 100 and the filter assembly 200 engaged with the adapter 100.

The modified structure of the present invention can obtain the aforementioned effects of the above embodiments without using the slide plate for coupling the filter assembly to the adapter and the release button unit for separating the filter assembly from the adapter.

Figure 4A:
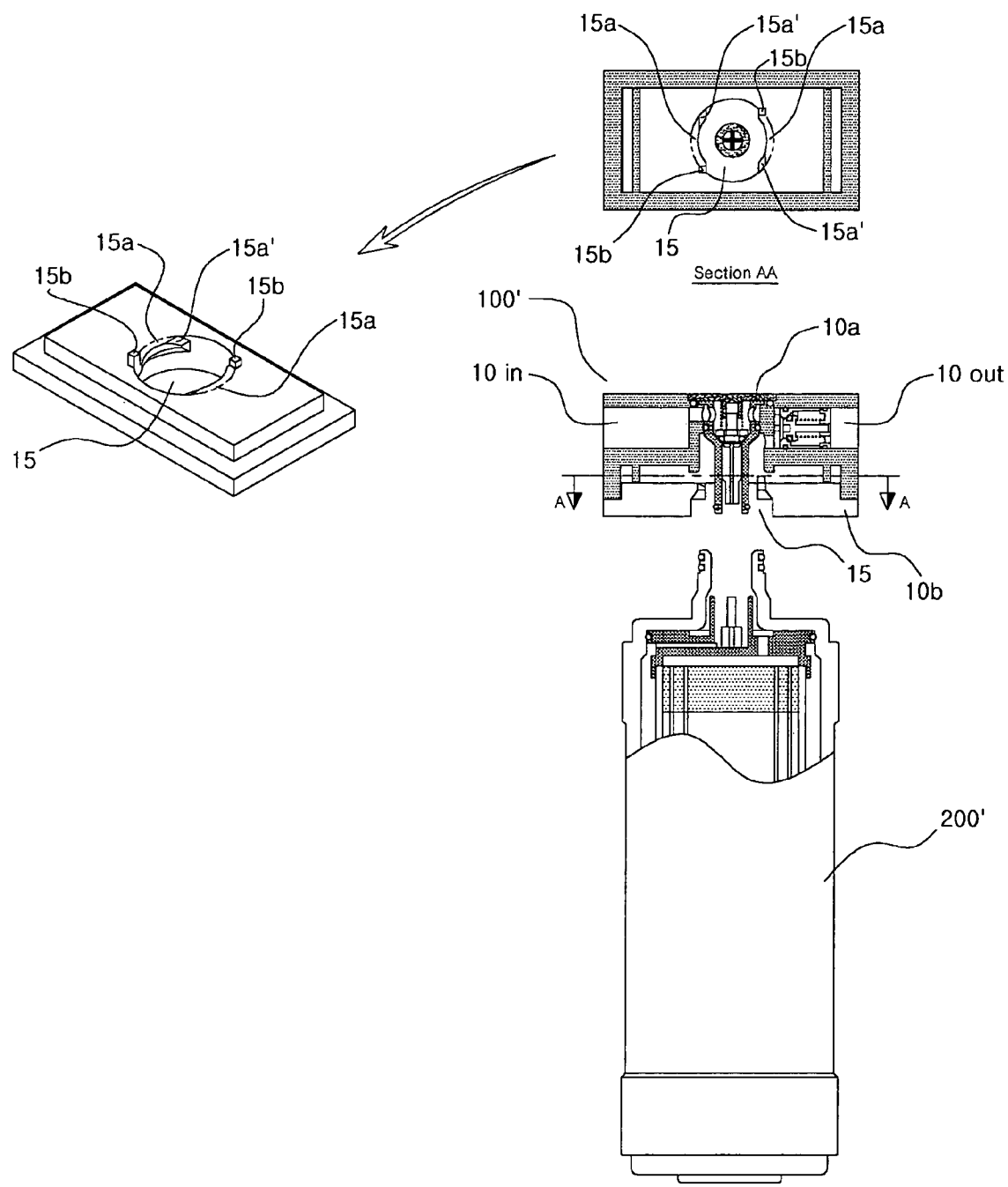
FIG. 4A is a view showing an adapter separated from a filter assembly according to another embodiment of the present invention.
Figure 4B:
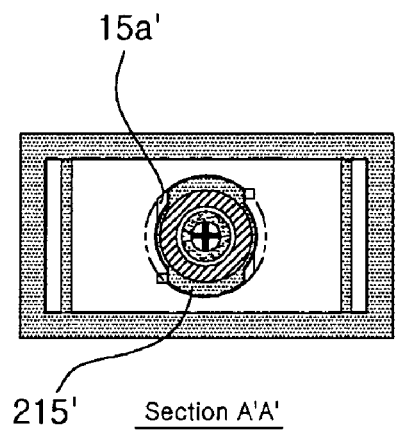
FIG. 4B is a view showing a filter assembly just before it is coupled with an adapter from a state shown in FIG. 4A.
Figure 4B:
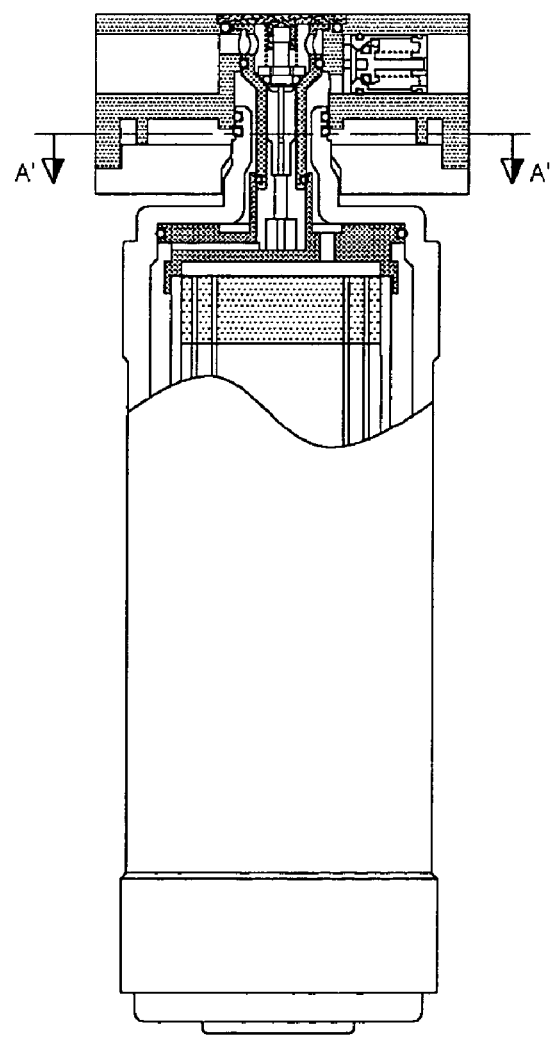
Figure 4C:
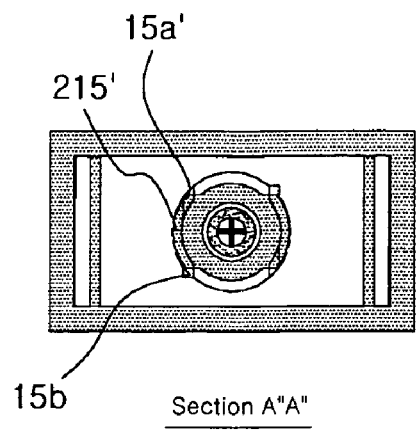
FIG. 4C is a view showing a filter assembly coupled with an adapter from a state shown in FIG. 4B.
Figure 4C:
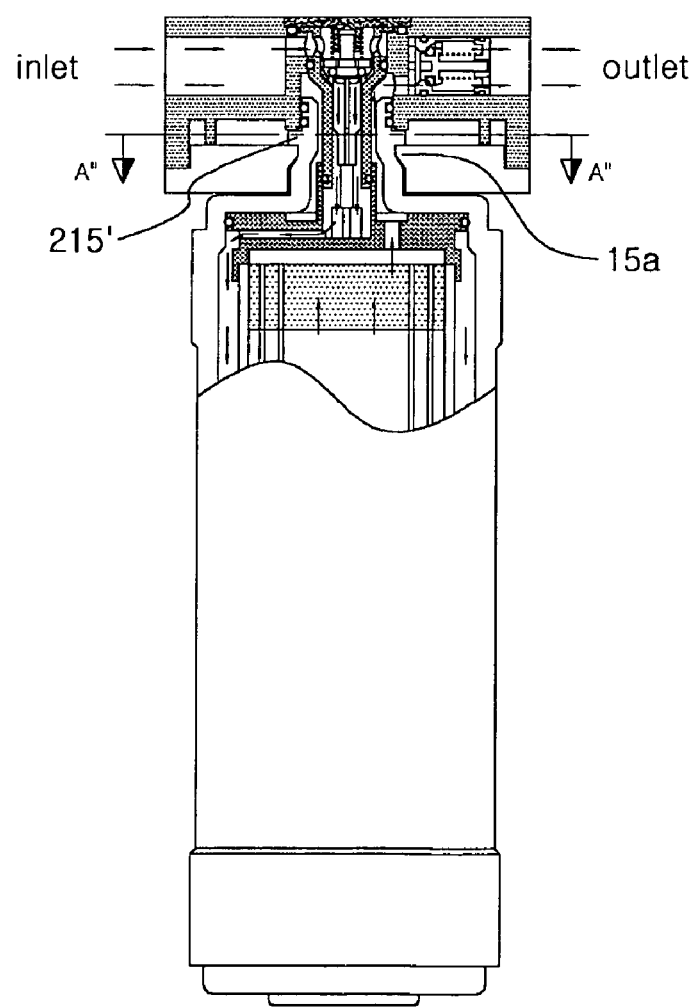

As shown in FIGS. 4*a* to 4*c*, an adapter 100' according to one embodiment of the present invention does not have the slide plate and the release button unit, but is provided with partially circumferential rims 15*a* which are aligned in opposition to an outer peripheral portion of a central hole 15 of a lower cover.

Figure 5A:
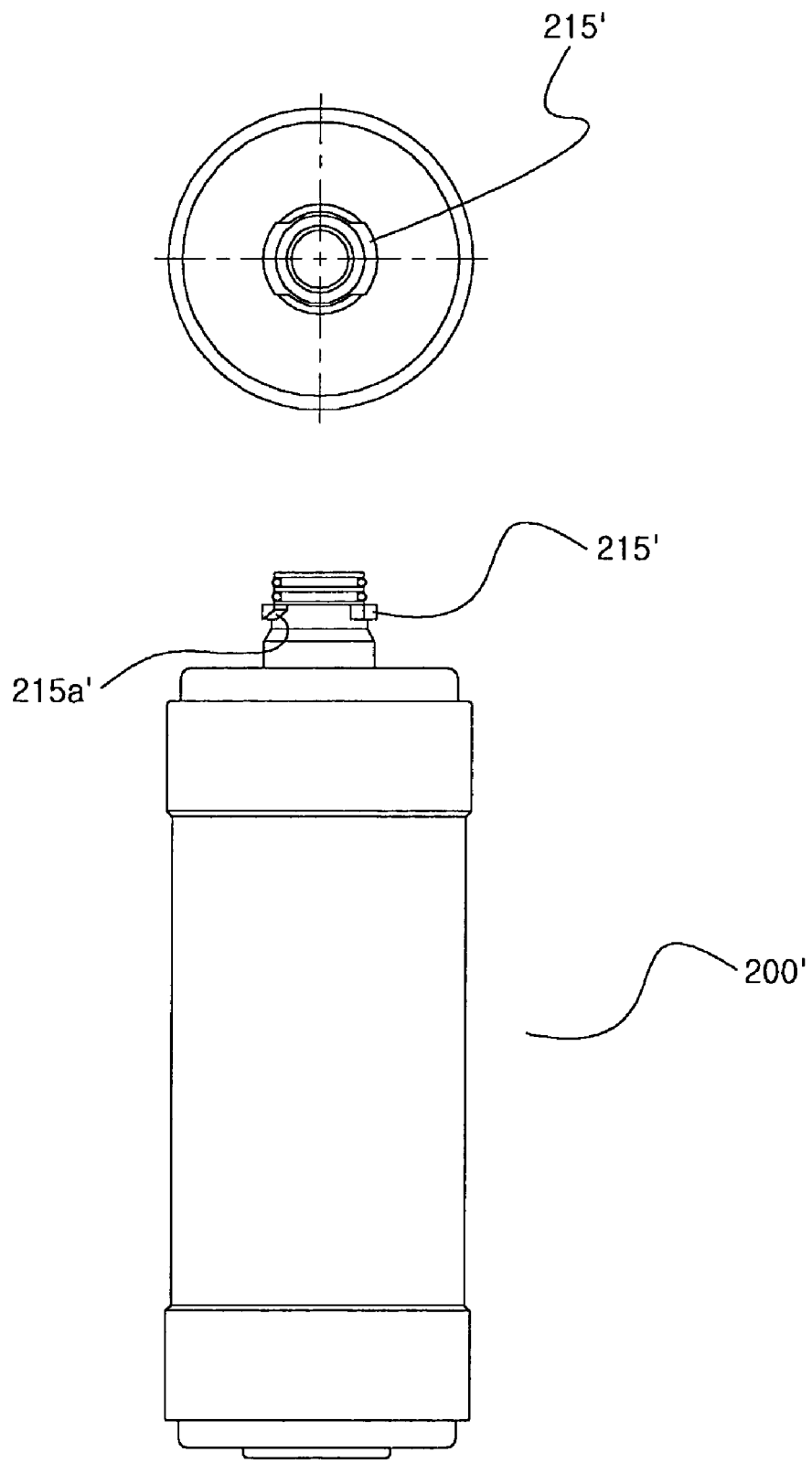
FIG. 5A shows a front view and a plan view of a filter assembly according to another embodiment of the present invention.
Figure 5B:
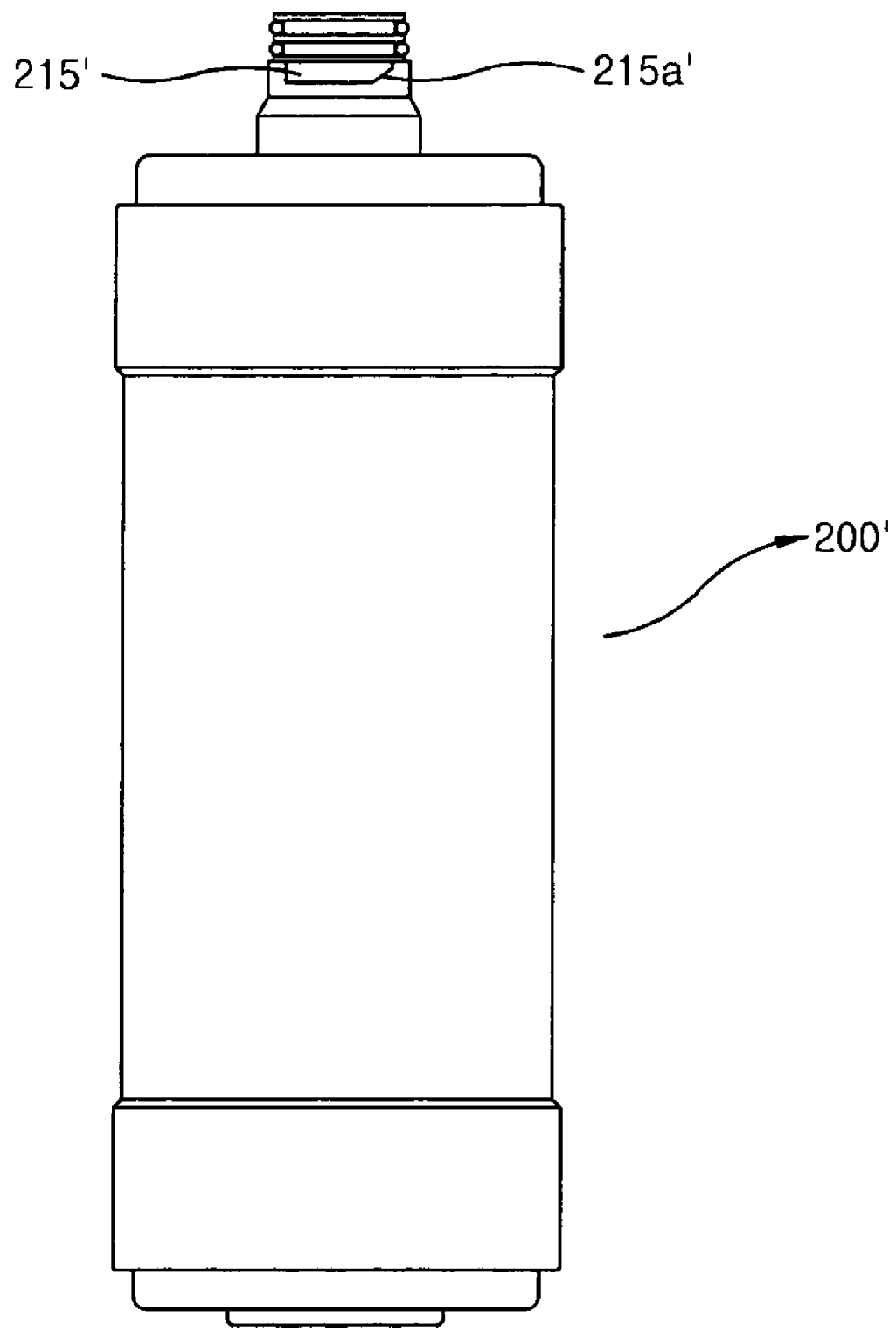
FIG. 5B is a side view of a filter assembly shown in FIG. 5A.

In addition, according to one embodiment of the present invention, as shown in FIGS. 5*a* to 5*c*, there is provided a filter assembly 200' having opposite partially arcuate collar flanges 215' provided at an outer portion of the cylindrical fluid passage formed at an inlet portion of the filter assembly in such a manner that the filter assembly 200' can be engaged with the adapter 100'.

Accordingly, when the filter assembly 200' is engaged with the adapter 100', the cylindrical fluid passage of the filter assembly 200' is inserted into the central hole 15 of the lower cover. At this time, in a state that the adapter 100' is separated from the filter assembly 200' as shown in FIG. 4A, the filter assembly 200' is inserted into the adapter 100' such that the partially arcuate collar flanges 215' matche with the central hole 15 of the lower cover as shown in FIG. 4B. After that, as shown in FIG. 4C, the adapter body and the filter assembly are rotated relative to each other so that the partially arcuate collar flanges 215' move riding along the partially circumferential rims 15*a* formed at the central hole 15 of the lower cover of the adapter 100', thereby coupling the filter assembly 200' with the adapter 100' by the effect of partial screwing therebetween. The procedure for decoupling the filter assembly 200' from the adapter 200' is inverse to the above coupling procedure.

Each of the partially arcuate collar flange 215' is provided at one end thereof with an inclined portion 215a'. Accordingly, when the filter assembly 200' is rotated relative to the adapter 100', the circumferential rim 15a formed in the central hole 15 of the lower cover makes contact with the inclined portion 215a' of the partially arcuate collar flange 215'. Thus, horizontal rotating force applied to the inclined portion 215a' of the partially arcuate collar flange 215' is upwardly biased due to the inclined portion 215a' so that the filter assembly 200' is easily upwardly moved while riding along the inclined portion. At the same time, the partially arcuate collar flange 215' smoothly moves along the circumferential rim 15a so that the filter assembly 200' is coupled with the adapter 100'.

In addition, the inclined portions 215a' formed at the partially arcuate collar flanges 215', which are aligned in opposition to each other, have the same orientation. The circumferential rim is preferably provided on the other end thereof with a stopper protrusion 15' in such a manner that the partially arcuate collar flange cannot be further moved when the partially arcuate collar flange reaches a coupling position by moving along the circumferential rim 15a.

Other features and coupling functions of the adapter 100' and the filter assembly 200' are substantially identical to those of the above-mentioned adapter and filter assembly, so detailed description thereof will be omitted below.

Figure 6:
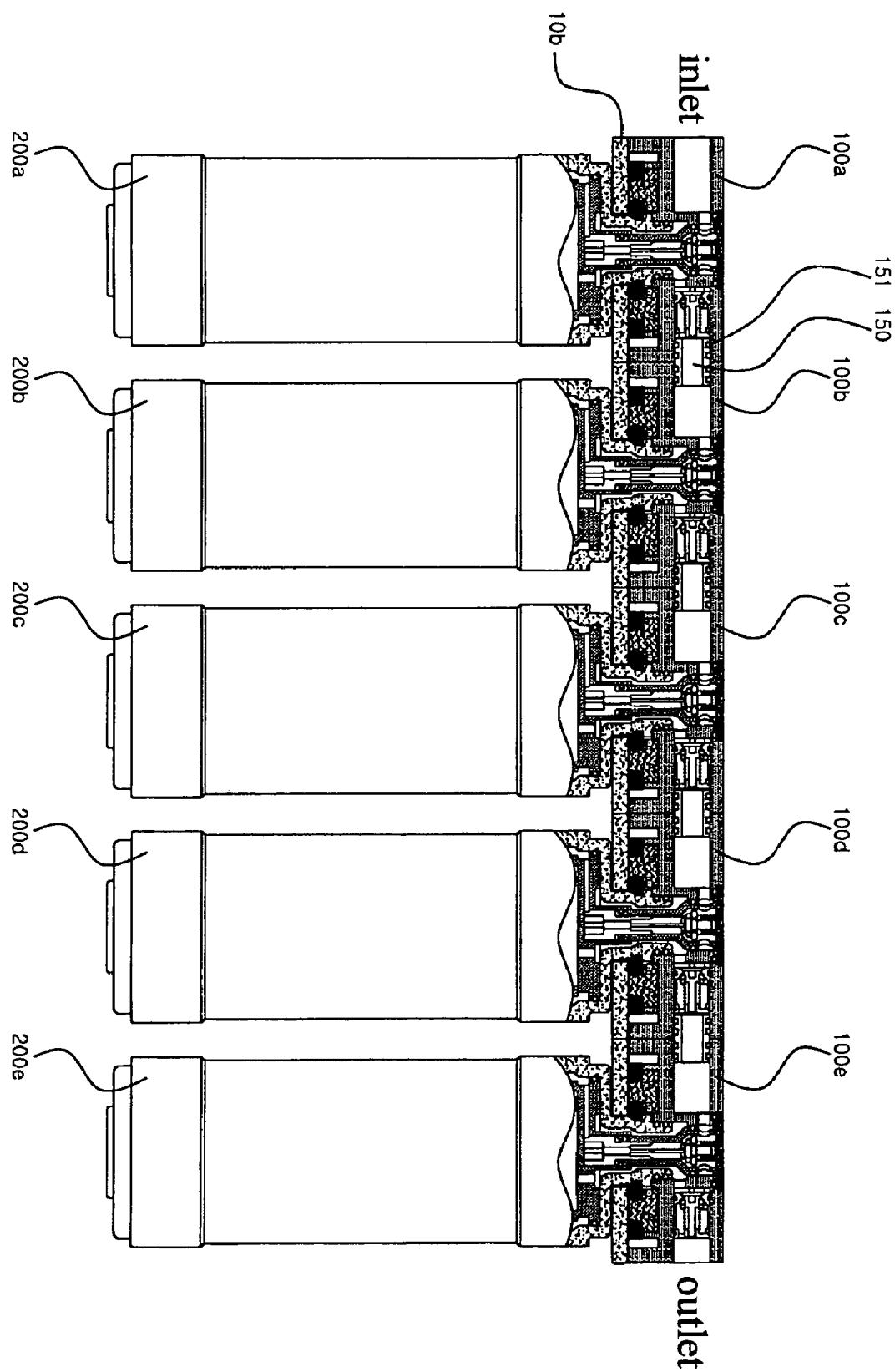
FIG. 6 is a view showing a structure of a multiple adapter for installing a plurality of filter assemblies therein according to one embodiment of the present invention.

According to still another aspect of the present invention, there is provided a multiple adapter engaged with a plurality of filter assemblies 200a, 200b, 200c, 200d and 200e. FIG. 6 shows the multiple adapter.

The multiple adapter includes a plurality of one-touch fitting type adapters 100a, 100b, 100c, 100d and 100e aligned parallel to each other, backflow preventing valves (30, see FIG. 1A) installed at outlet ports of the one-touch fitting type adapters 100a, 100b, 100c, 100d and 100e, and plug type connection members 150 installed between inlet ports and outlet ports of adjacent adapters.

In the products equipped with a plurality of filter assemblies, such as water purifiers or water ionizers, each filter assembly has its own function and life span, so filter assemblies are selectively exchanged when the life span of the filter assemblies expires. At this time, the source water must be cut off from inflowing during filter assembly exchange work.

However, the multiple adapter according to the present invention includes the check valve 20 therein, so it is not necessary to perform additional work for cutoff of the inflow of the source water during the filter assembly exchange work. That is, according to the present invention, the user can simply exchange the filter assembly with a new one by separating the old filter assembly from the adapter and coupling a new filter assembly with the adapter while pushing the release button unit. In addition, the filter assembly exchange work can be simply carried out by separating the old filter assembly from the adapter through rotating the old filter assembly relative to the adapter and coupling the new filter assembly with the adapter by rotating the new filter assembly relative to the adapter.

Preferably, a gap formed between an outer peripheral surface of the plug connection member 150 and inner peripheral surfaces of the inlet and outlet ports is sealed by means of the O-ring. In addition, each single adapter of the multiple adapter can be rotated about the plug type connection member in such a manner that the lower cover 10b installed at the lower portion of the adapter body 10 can be rotatably moved toward the user, so the user can easily and conveniently perform the filter exchange work.

In addition, the present invention not only relates to the one-touch fitting type single or multiple adapter, but also to a water purifying system equipped with at least one of filter assemblies. That is, the one-touch fitting type single or multiple adapter and the filter assembly detachably engaged with the one-touch fitting type single or multiple adapter can be provided as a part of various water purifying systems. Accordingly, the present invention includes such various water purifying systems.

As described above, the present invention provides a one-touch fitting type adapter and a filter assembly in which the filter assembly used for machinery, such as a bidet or a refrigerator, is easily assembled with or disassembled from the adapter through a one-touch fitting manner such that the filter assembly is easily adapted for the machinery. In addition, the present invention provides a multiple adapter capable of coupling a plurality of adapters in series such that a plurality of filter assemblies used for a water purifier, a water ionizer or a functional water maker are detachably engaged with the multiple adapter through a one-touch fitting manner. Accordingly, unskilled persons, such as women or children, can easily exchange the filter with a new one at home without using an additional exchange tool. According to the present invention, it is not necessary to perform additional work for cutoff of the inflow of the source water during the filter exchange work, and the purified water remaining in fluid passages is prevented from flowing back or dropping down from the fluid passages, so reliability and satisfaction for the products can be improved.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A one-touch fitting type adapter for detachably engaging a filter assembly provided at one end thereof with a cylindrical fluid passage having a collar flange, the one-touch fitting type adapter comprising:

an adapter body formed at both upper sides thereof with an inlet port and an outlet port and formed at a center thereof with a central channel communicated with the inlet and outlet ports;

a valve installed in the central channel so as to adjust inflow or cutoff of source water flowing through the inlet port;

an upper cover for covering an upper portion of the central channel;

a lower cover installed at a lower portion of the adapter body and formed with a central hole communicated with the central channel of the adapter body, the cylindrical fluid passage of the filter assembly being inserted into the central hole of the lower cover;

a pair of slide plates installed on the lower cover, the slide plates having opposite inclined elongate holes and opposite arcuate sections for detachably coupling the collar flange formed at the cylindrical fluid passage of the filter assembly, the slide plates being elastically biased towards each other by means of a spring; and a release button unit including two parallel bars formed with protrusions inserted into the inclined elongate holes, respectively, and one horizontal push bar connecting ends of the parallel bars to each other, wherein, when the filter assembly is disassembled from the adapter, the horizontal push bar is pushed, so the parallel bars move in a forward direction while pushing sidewalls of the inclined elongated holes so that the slide plates horizontally move perpendicularly to a moving direction of the protrusions away from each other, thereby allowing the filter assembly to be disassembled from the adapter.

2. The one-touch fitting type adapter according to claim 1, wherein the valve includes a valve body having an inclined seat surface and being communicated with the inlet port, a fluid passage extending from the valve body to a lower portion of the central channel of the adapter body, a valve plunger having a plunger head closely adjacent to the inclined seat surface and being installed in the fluid passage such that the valve plunger opens/closes the fluid passage when the filter assembly is assembled with or disassembled from the adapter while moving in the fluid passage by means of pressing force applied thereto from the filter assembly, and a valve spring supported by the upper cover while elastically biasing the plunger head installed on the inclined seat surface of the valve body.

3. The one-touch fitting type adapter according to claim 1, wherein the end parts of the arcuate sections of the slide plates, which make contact with the collar flange formed at the fluid passage of the filter assembly when the filter assembly is assembled into the one-touch fitting type adapter, are formed with inclined portions so as to allow the filter assembly to be easily engaged with the arcuate sections through riding therealong.

4. The one-touch fitting type adapter according to claim 1, wherein a backflow preventing valve is installed in the outlet port of the adapter body so as to prevent residual purified water remaining at a rear portion of the outlet port from flowing back or dropping down from the outlet port when the filter assembly is disassembled from the adapter.

5. The one-touch fitting type adapter according to claim 1, wherein the horizontal push bar of the release button unit is formed with a mounting hole for a safety pin for preventing the push bar from being pushed so as to prevent the filter assembly from being unintentionally separated from the adapter.

6. A water purifying system comprising a one-touch fitting type adapter as claimed in claim 1.

7. A filter assembly detachably engaged with a one-touch fitting type adapter, the one-touch fitting type adaptor comprising an adapter body formed at both upper sides thereof with an inlet port and an outlet port and formed at a center thereof with a central channel communicated with the inlet and outlet ports;

a valve installed in the central channel so as to adjust inflow or cutoff of source water flowing through the inlet port;

an upper cover for covering an upper portion of the central channel;

a lower cover installed at a lower portion of the adapter body and formed with a central hole communicated with the central channel of the adapter body, the cylindrical fluid passage of the filter assembly being inserted into the central hole of the lower cover;

a pair of slide plates installed on the lower cover, the slide plates having opposite inclined elongate holes and opposite arcuate sections for detachably coupling the collar flange formed at the cylindrical fluid passage of the filter assembly, the slide plates being elastically biased towards each other by means of a spring; and a release button unit including two parallel bars formed with protrusions inserted into the inclined elongate holes, respectively, and one horizontal push bar connecting ends of the parallel bars to each other, wherein, when the filter assembly is disassembled from the adapter, the horizontal push bar is pushed, so the parallel bars move in a forward direction while pushing sidewalls of the inclined elongated holes so that the slide plates horizontally move perpendicularly to a moving direction of the protrusions away from each other, thereby allowing the filter assembly to be disassembled from the adapter, and the filter assembly comprising:

an outer housing formed at an inlet portion thereof with a cylindrical fluid passage having a collar flange;

a filter member installed in the outer housing spaced apart from an inner wall of the outer housing; and a water guide installed between an upper end of the filter member and the cylindrical fluid passage of the outer housing in order to guide source water to the filter member when source water is introduced thereto through the valve of the one-touch fitting type adapter and to guide water purified by the filter member into the outlet port of the one-touch fitting type adapter, wherein the water guide includes an annular partition wall forming an inflow passage of source water through the valve and for preventing source water from being mixed with the purified water, a source water path transfer passage for guiding the source water from the inflow passage of the partition wall to a flowing space formed between the sidewall of the filter member and the inner wall of the outer housing, a purified water outlet passage for discharging water introduced from the flowing space into and purified by the filter member to an exterior through the outside of the inflow passage of the partition wall, and a push rod installed at an inner central portion of the annular partition wall so as to open the valve of the adapter while making press-contact with the valve.

8. The filter assembly according to claim 7, wherein the filter member includes at least one selected from the group consisting of a hollow fiber filter, a non-woven fabric filter, an activated carbon filter, a reverse osmosis membrane filter, and a functional ceramic filter.

9. A water purifying system comprising a filter assembly as claimed in claim 7.

10. A multiple adapter for engaging a plurality of filter assemblies, the multiple adapter comprising:

a plurality of one-touch fitting type adapters aligned in parallel to each other, wherein the respective one-touch fitting type adaptor comprises:

an adapter body formed at both upper sides thereof with an inlet port and an outlet port and formed at a center thereof with a central channel communicated with the inlet and outlet ports;

a valve installed in the central channel so as to adjust inflow or cutoff of source water flowing through the inlet port;

an upper cover for covering an upper portion of the central channel;

a lower cover installed at a lower portion of the adapter body and formed with a central hole communicated with the central channel of the adapter body, the cylindrical fluid passage of the filter assembly being inserted into the central hole of the lower cover;

a pair of slide plates installed on the lower cover, the slide plates having opposite inclined elongate holes and opposite arcuate sections for detachably coupling the collar flange formed at the cylindrical fluid passage of the filter assembly, the slide plates being elastically biased towards each other by means of a spring; and a release button unit including two parallel bars formed with protrusions inserted into the inclined elongate holes, respectively, and one horizontal push bar connecting ends of the parallel bars to each other, wherein, when the filter assembly is disassembled from the adapter, the horizontal push bar is pushed, so the parallel bars move in a forward direction while pushing sidewalls of the inclined elongated holes so that the slide plates horizontally move perpendicularly to a moving direction of the protrusions away from each other, thereby allowing the filter assembly to be disassembled from the adapter;

backflow preventing valves installed at outlet ports of the one-touch fitting type adapters; and plug type connection members installed between inlet ports and outlet ports of adjacent adapters such that the adjacent adapters rotate relative to each other, wherein O-rings are provided between outer peripheral surfaces of the plug type connection members and inner peripheral surfaces of the inlet ports and outlet ports, wherein the respective filter assembly is detachably engaged with the one-touch fitting type adaptor, and comprises:

an outer housing formed at an inlet portion thereof with a cylindrical fluid passage having a collar flange;

a filter member installed in the outer housing spaced apart from an inner wall of the outer housing; and a water guide installed between an upper end of the filter member and the cylindrical fluid passage of the outer housing in order to guide source water to the filter member when source water is introduced thereto through the valve of the one-touch fitting type adapter and to guide water purified by the filter member into the outlet port of the one-touch fitting type adapter, wherein the water guide includes an annular partition wall forming an inflow passage of source water through the valve and for preventing source water from being mixed with the purified water, a source water path transfer passage for guiding the source water from the inflow passage of the partition wall to a flowing space formed between the sidewall of the filter member and the inner wall of the outer housing, a purified water outlet passage for discharging water introduced from the flowing space into and purified by the filter member to an exterior through the outside of the inflow passage of the partition wall, and a push rod installed at an inner central portion of the annular partition wall so as to open the valve of the adapter while making press-contact with the valve.

11. A water purifying system comprising a one-touch fitting type multiple adapter as claimed in claim 10.

* * * * *